Aug. 7, 1962  G. W. ELLIS  3,048,655
OPTICAL LIGHT VALVE
Filed May 31, 1960
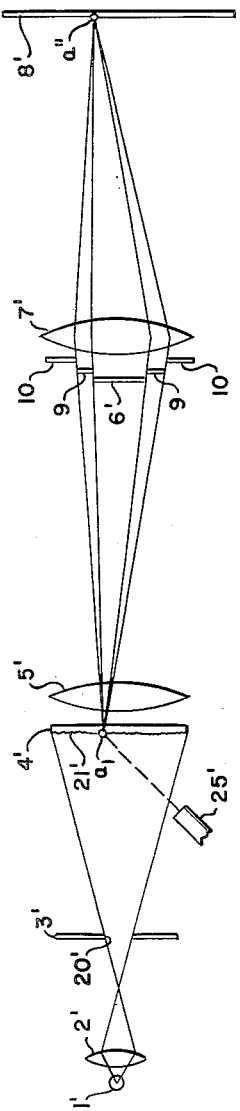
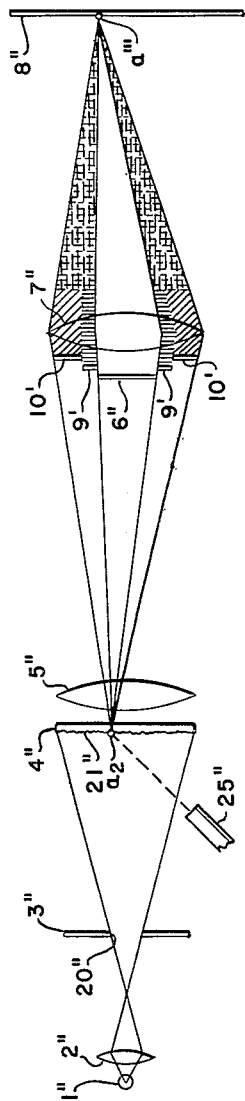
George W. Ellis
INVENTOR.
BY Joseph P. Kates
ATTORNEY 3,048,655
OPTICAL LIGHT VALVE
George W. Ellis, Liverpool, N.Y., assignor to General
Electric Company, a corporation of New York
Filed May 31, 1960, Ser. No. 32,964
7 Claims. (Cl. 178—7.86)

The present invention relates to production of colored images and more particularly refers to a means and a method of producing a particular color image controlled by a single electrical signal which can be varied at a very fast rate of the order of less than $10^{-7}$ seconds. An optical light valve of the type for projecting television images on a screen is utilized.

In light valves of this type, light is controlled by deformations in a transparent control layer which cause a certain portion of light passing through these deformations to be deviated from its original path, which may be through a projection lens to a viewing screen. The exact position of the new path depends upon the depth of deformation in the control layer and laws of refraction and diffraction. In general, the greater the deformation is the greater the path deviation is. Such a system may include a light source and a lens disposed in front of a first grating through which the light is passed onto the deformable medium. Closely adjacent to the deformable medium may be a lens which may focus the light from the deformable medium when in the absence of deformation of that medium onto a mask which is aligned with the light source, the first slit system, the deformable medium and the lens. The mask may comprise a bar of a second system of bars and slits similar to the first system through which the light was originally passed. When the deformable material is deformed as by scanning from an electron beam, the light is diffracted around the second mask (the bar portion of the second system of slits and bars). It is projected then on a screen by a projection lens following and axially aligned with the second mask. Such a system is described in Patent No. 2,813,146 of Dr. W. E. Glenn for Colored Light System, issued November 12, 1957, in column 1, lines 22–50 of that patent.

The term "optical light valve" as used in the specification and claims herein means a display system of the type described and illustrated in the above-identified reference to the Dr. Glenn patent and employing a source of illumination, a first and a second mask or a first and a second system of bars and slits, and a medium deformable by electronic means such as by a beam from an electron gun to diffract light around the second mask or system to form a visual display in accordance with such deformation.

The present invention comprises such a system. However, in the light path around the opaque mask of the second bar and slit system several color filters are disposed in an array such that a particular filter or group of filters intersected by the light is determined by the amount the light is deviated from the mask. By this means the control layer, in addition to controlling light intensity, also controls color. The amount (depth) of deformation of the deformable layer depends primarily upon the intensity of the beam which scans it. The deviation of light rays due to this deformation depends upon the depth of deformity in the deformable material. Thus, a first pair or a concentric ring of filters may be spaced a short distance from or adjacent to the exterior periphery of the mask. The filter permits only light of one type to pass. The color of light passed by the most closely adjacent group of filters to the mask will be projected on the screen in the presence of deformation of the deformable medium sufficient to deflect the light beam on that filter group. A second and more groups of filters may be disposed further out for greater deformation. These groups of filters pass different colors than the first filter group. Thus, depending upon the extent of deformation and consequent deviation different colors are projected upon the screen.

The information display device of this invention displays data rapidly in several colors. This is desirable as a means for rapid positive identification of classes of data. For example, on a military plotboard type of display it may be desirable to show data concerning friendly units in one color and data of enemy units in a different color. This allows instant visual differentiation of the two classes of data.

A simple prior art method of producing colored images for a television type of display is to interpose a rotating disk made up of segments of color filters between the light source and the observer. Then the information is presented sequentially such that the information to be displayed in a certain color is presented at the exact time the appropriate color filter segment of the disk is in the light path. This method requires that the information be presented in a certain sequence such as from upper left to lower right as in a television scan. This method cannot be used where the information is presented in random fashion.

Another prior art method of color display is the simultaneous color television display device. Such devices have poor resolution, low brightness and/or extreme complexity. Such complex devices produce tonal gradations necessary for good reproduction of pictures. However, this function is unnecessary for many types of display, such as display of alpha-numeric data and symbology, a visual display restricted to a few of the order of about from 2 to 10 different color displays.

The present invention overcomes these and other disadvantages of the prior art. It is economical and useful where brightness gradations are not required but where color is desired as a means of identification between a few different kinds of data. For example, it is useful for a visual display restricted to a few classes of the order of about two to ten different color displays.

An object of the present invention is to provide a visual display of color images controlled by the depth of deformations in the control layer in an optical light valve type system.

Another object of the present invention is to provide a visual display of different colors on a screen wherein the colors distinguish different data or classes of data by a cheap and simple apparatus using the principle of deformation of a deformable layer by electron beam means and wherein a bar and slit system for projecting light onto a screen is modified only by the addition of an array of color filters therearound.

Another object of the present invention is to provide for instant differentiation of two classes of data for uses such as military plotboard display by the relatively simple inprovement in a light valve projector of adding at least one group of colored filters disposed contiguous to or in spatial relationship to the plane of the outer periphery of the mask of the projector.

Another object of the present invention is to provide a color coding display of a number of classes of information by use of a filter arrangement in an optical light valve projector wherein an electrical signal is varied at a fast rate to cause substantially instantaneous corresponding color display.

Another object of the present invention is to provide colored images in an optical light valve by means of addition of a few color filters.

While the novel and distinctive features of the invention are particularly pointed out in the appended claims, a more expository treatment of the invention, in principle and in detail, together with additional objects and advantages thereof is afforded by the following description and accompanying drawing in which:

FIG. 1 is a schematic diagram of an illustrative embodiment of the present invention showing an array of color filters disposed around the mask in a light valve projector to produce color display of information on the screen, and, FIG. 2 is a schematic representation of the device of FIG. 1 showing the ray diagrams when light is deviated by large deformation of the control media sufficient to cause deviation through two sets of filters, the sets being spaced at sequentially increasing distances from the mask.

Now referring to FIG. 1, the simplified sketch of an optical light valve projector, a lamp 1' providing a source of intense light is aligned axially with and in front of a condensing lens 2'. A solid plate or mask 3' is provided and apertured at aperture 20'. The slit or aperture 20' in solid plate 3' plus the plate may form a portion of a first bar and slit arrangement of a multiple bar and slit arrangement to be described or may comprise a single plate and aperture therein. Lamp 1', condensing lens 2' and the plate 3' are axially aligned. Disposed in front of the plate 3' is a support 4' which is made of a transparent material such as glass. Disposed on the surface of glass support 4' is a deformable media or deformable control fluid 21'. Deformable control fluid 21' may be a liquid such as described in the aforementioned Patent No. 2,813,146 of Dr. Glenn. Closely adjacent to the control media 21' may be a lens 5'. In spatial relation to and axially aligned with the lens 5' and the control media 21' is a mask 6'. Mask 6' may be actually an element of a second bar and slit system which is combined with the first bar and slit system, the illuminating source, the deformable media and the lens to form the optical valve system which the invention herein adapts to color display. Disposed in axial alignment with and spaced from the mask 6' is a projection lens 7'. Aligned with and in spatial relationship to projection lens 7' is a screen 8'. The device of FIG. 1 operates as follows:

Light from the lamp 1' is collected by condensing lens 2' and imaged at aperture 3'.

Through aperture 3' it then passes through the control layer 21'. When the control layer is smooth the light is imaged by lens 5' onto opaque mask 6' and absorbed. Assume that a slight deformation occurs, for example, at point $a_1$ on the control layer 21' causing part of the light falling on point $a_1$ to be deflected from its original path where it would strike the mask 6' and be absorbed to a new path external of mask 6'. The new path does not strike the mask 6'. The light rays of the new path travel through color filter 9' or filters 9' and 10' through projection lens 7'. From projection lens 7' the ray is deflected onto point $a''$ on the viewing screen 8' where it helps form a projected image of point $a_1$.

A greater deformation at point $a_1$ on the control layer 21' causes a greater deviation of the same rays of light from point $a_1$. The path through filter 10 is such a path of greater deviation which is further from the periphery of mask 6'. A conical array of light rays might thus be projected around mask 6' to form a conical projection upon projection lens 7'. The cone has its apex of projection on the screen 8' at point $a''$.

Color filters 9 and 10 may be exterior to each side of the mask 6', filters 10 being exterior of filters 9. For example, filter 9 is a red filter and filter 10 is a green filter. The filters are in staggered progressive axial displacement from mask 6' for mechanical expediency. In the case of a bar and slit arrangement a group of two bar-shaped filters adjacent to and closely spaced from the mask 6' and an additional two bar-shaped filters would be provided spaced further outward than and preferably axially displaced from the first two filters 9. In the case of a circular, rectangular, or other shaped solid mask 6', the filters 9 and 10 (or 9' and 10' of FIG. 2) are of ring or other configuration corresponding to the shape of the periphery of the mask. The requirement is that the filters be of shape such that light which misses the mask goes through the filters.

In operation, the light which is imaged at aperture 20' falls upon the deformable surface 21' which is deformed by means of electron gun 25' at point $a_1$. The light rays are deviated around the mask 6' and in the case of a relatively small deformation, project upon the filters 9. Only red light passes through the filters 9. A red spot of light is observed therefore at the point $a''$ when the light rays are deflected through filter 9. This will indicate a relatively small deviation to the observer, and its significance as information will be appreciated rapidly by association of the information with the color. The information fed in determines the intensity of modulation and therefore the depth of deformation of the deformable material. The color of point $a''$ on the screen is a function of the depth of deformation at point $a_1$ on the control layer. Since in practice, the deformation at point $a_1$ is usually of complex shape, there is actually, as shown in FIG. 1, deviated light in all of the shaded area rather than it being a straight thin line ray configuration.

Now referring to FIG. 2 assume that a greater depth of deformation of the medium 21'' occurs. In this case the deviation around the mask 6'' will be extended such that the beam of light covers the surface area of both filters 9' and 10' and accordingly both red and green light is projected through the projection lens 7'' onto the point $a'''$ of screen 8''. The combination of red and green light striking $a'''$ appears to the observer as yellow light. Thus, the second group of information which is represented by a greater intensity of beams from the beam projecting device 25'' and hence a different color on the screen indicates different data to the observer than does the slight deviation and corresponding color.

This approach can be extended obviously, by use of several different filters depending upon the number of classes of data desired to be color coded.

While a specific embodiment of the invention has been shown and described, it should be recognized that the invention should not be limited thereto. It is accordingly intended in the appended claims to claim all such variations as fall within the true spirit of the invention.

What is claimed is:

1. An optical light valve system for screen display of at least two classes of data, said system comprising a light source, a condensing lens, a first apertured plate, said condensing lens being disposed to image said light source in the slit in the aperture in said apertured plate, a deformable medium and a second lens, said deformable medium and said second lens being disposed in closely adjacent axial relationship, and in axial relationship to said aperture and said light source, a mask disposed in spatial relationship to and axially aligned with said second lens and said deformable media, a plurality of color filter groups disposed in respective displaced positions from said mask and from each other normal to said axis of alignment, each of said groups comprising at least one filter, a screen member, means to deform said deformable media, a projection lens and said screen axially aligned with said mask, light rays extending through said aperture on being deformed by said deformable media passing through at least one of said filters to provide a colored image at a point on said screen by projection of said projection lens of light from said filter on said screen, the amount of deformation determining selectively that one and more than one of said filters have light paths therethrough and therefore determining the color projected upon said screen.

2. A color image display system comprising a screen, means aligned with said screen to project light rays on said screen, a first and a second mask, a deformable control medium, a source of illumination, said masks and medium being aligned and in spatial relation with one another such that selectively in normal state of said medium light rays passing by said first mask are blocked by said second mask and in deformed state of said medium said light rays are deflected past said second mask, at least one color filter member disposed beyond and contiguous to a peripheral portion of said second mask such that in said deformed state substantially a single color of the light rays passes through said filter to illuminate said screen in said color.

3. A system for producing color images of colors corresponding to intelligence controlling electrical signals, said system comprising a deformable transparent medium, electron beam projection means to deform said medium, the amount of deformation being in accordance with the controlling electrical signals, said signals representing different intelligences, opaque mask means, at least a first and a second color filter, said first filter being contiguous to at least a portion of the periphery of said mask, said second filter being located contiguous to a point spaced from the axis of said mask a distance extending to the outer edge of said first filter, a screen, means to project light passed by said filters to said screen, a light source, means arranged to cause light from said light source to be selectively blocked by said mask in the absence of deformation of said medium and to cause light to be diffracted around said mask in the presence of deformation an amount corresponding to the amount of said deformation, at least one of said intelligences causing signals which deform said medium an amount to effect diffraction substantially through said first filter, another of said intelligences causing signals which deform said medium an amount to effect diffraction through both said first and second filters to produce a composite color of the light from both filters to appear on the screen, said first color and said composite color thereby providing rapid distinguishing indicia to an observer of the intelligence transmitted.

4. In combination with an optical light valve including a deformable control medium, electric signal control means to deform said media and a mask around which light is diffracted in the presence of deformation; color filter means disposed externally of and adjacent to a locus parallel to the edge of said mask, whereby upon deformation of the control medium, a colored image is formed.

5. The apparatus of claim 4 including a second color filter disposed externally of and adjacent to a locus parallel to the edge of said first filter which edge is opposite to the edge of said mask.

6. In combination, a source of light, a surface to be illuminated thereby in a predetermined color, a deformable light transmitting medium and a mask between said source and surface, said mask intercepting light from said source when said medium is unmodulated thereby interrupting illumination of said surface, means to modulate said medium to cause light to be diffracted thereby around said mask to said surface, and a color filter in the path of said diffracted light adapted to pass only light of said predetermined color.

7. In combination, a light source, a surface to be selectively illuminated in different desired colors from said source, a deformable light transmitting medium and a mask between said light source and said surface, said mask normally intercepting light passed by said medium when said surface is unmodulated whereby said surface is not illuminated, means to modulate said medium to cause light to be diffracted from said mask by amounts dependent upon the extent of modulation of said medium, and a plurality of light filters in the paths of said diffracted light, each light filter passing light of a color corresponding to the respective character of modulation of said medium and means to direct light passed by all the filters on said surface whereby the color of illumination of the surface is dependent upon the character of modulation of the medium.

References Cited in the file of this patent
UNITED STATES PATENTS

| | | |
|---|---|---|
| 2,807,737 | Wright | Sept. 24, 1957 |
| 2,813,146 | Glenn | Nov. 12, 1957 |